Sept. 8, 1931.   W. A. STOVER ET AL   1,822,323
TRAY FOR BUBBLE TOWERS
Filed March 6, 1930

INVENTORS
William A. Stover
and Wallace G. Palmer
BY Arthur C. Brown
ATTORNEY

Patented Sept. 8, 1931

1,822,323

UNITED STATES PATENT OFFICE

WILLIAM A. STOVER AND WALLACE G. PALMER, OF TULSA, OKLAHOMA

TRAY FOR BUBBLE TOWERS

Application filed March 6, 1930. Serial No. 433,762.

Our invention relates to absorbers and like apparatus employed in the oil industry for absorbing one or more components from gas or vapors, and more particularly to bubble trays and caps used in apparatus of this character for counter-current absorption, distillation, fractionation, and similar industrial processes.

The principal objects of our invention are to provide trays including troughs and caps of simple and economical construction having a large capacity, a maximum intimacy of contact between counter-flowing fluids and liquids, and a plurality of distributors for handling widely varying quantities of gas or vapors efficiently and uniformly.

In accomplishing these and other objects of our invention we have provided improved details of structure the preferred form of which is illustrated in the accompanying drawings wherein.

Figure 1:
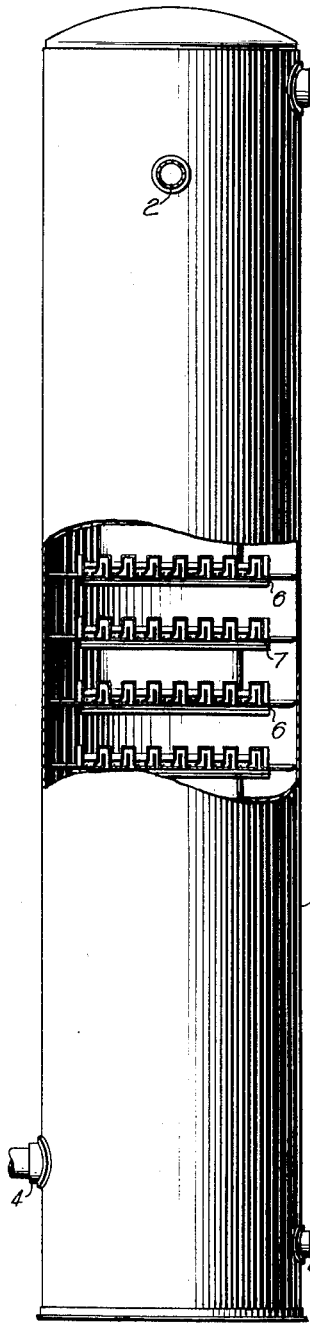
Fig. 1 is an elevational view of an absorption tower, a portion of the side wall being broken away to illustrate the arrangement within the tower of trays embodying our invention.
Figure 2:
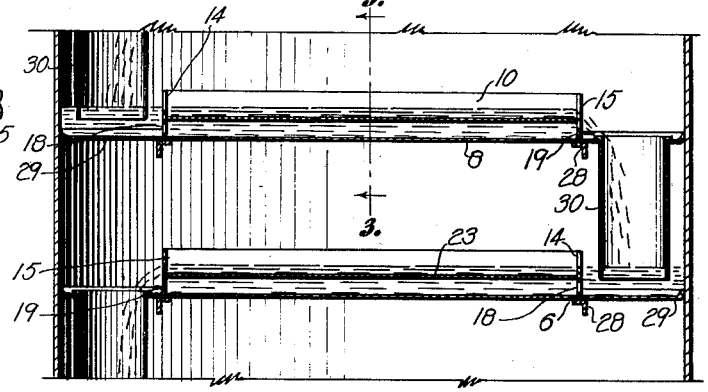
Fig. 2 is a central section of a portion of the tower and a longitudinal section of trays on the line 2—2, Fig. 3.
Figure 3:
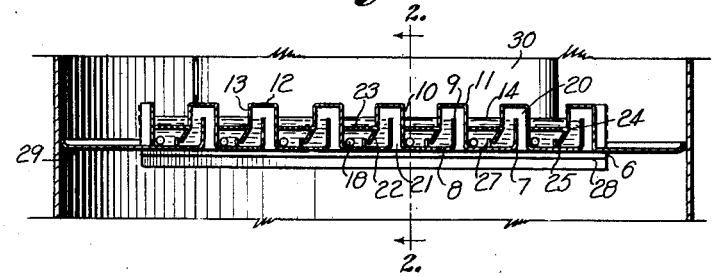
Fig. 3 is a central section of a portion of the tower and a cross section of trays on the line 3—3, Fig. 2.
Figure 4:
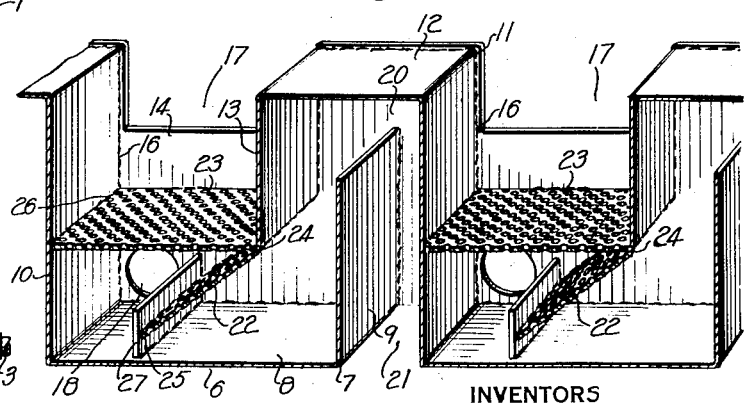
Fig. 4 is a fragmentary sectional view in perspective, of the inlet end of a tray, including troughs and caps, particularly illustrating the construction of inter-cooperating troughs and cap members and of perforated baffles.

Referring more in detail to the drawings: 1 designates a cylindrical absorption tank or tower having an oil inlet 2, an oil outlet 3, a gas inlet 4 and a gas outlet 5. Bubble trays 6 are fixed horizontally in the absorber in regularly spaced relation to direct flow of oil entering the upper end of the absorber in alternate directions over each successive lower tray for absorbing lighter fractions of oil from the gas or vapors flowing upwardly through liquid in the trays.

Each tray includes a plurality of parallel longitudinal trough and cap members comprising a trough portion 7, having a horizontal bottom 8, an upstanding outer wall 9, and a vertical inner wall 10 of greater height than the outer wall and terminating in a cap portion 11 which comprises an upper wall 12 and a downwardly depending flange 13. The individual trough and cap members of each tray are preferably formed of one continuous sheet of metal.

The troughs, arranged parallel to each other, with the cap portion of one trough extending over the outer wall of an adjacent trough, are mounted between inlet and outlet weir plates 14 and 15 respectively, and welded thereto as indicated at 16. Notches 17 are cut in the weir plates, between the cap portions, to lower the overflow edge of the plates to a height approximately equal to the walls 9. Inlet ports 18 are provided in the weir plates 14, the outlet plates 15 having relatively small perforations 19 for draining the troughs upon discontinuing operation of the apparatus.

With this inter-cooperating arrangement of the trough and cap portions, a tortuous passage 20 is formed between two adjacent troughs, said passage having an inlet 21 continuing upwardly between the outer wall 9 of one trough and the inner wall 10 of the adjacent trough, over the edge of the wall 9, and downwardly between said wall and overhanging flange 13, the outlet of the passage being restrained by primary and secondary distributing plates 22 and 23 respectively.

The distributing plates are preferably constructed of single perforated metal sheets, each bent as indicated at 24, to form an acute angle, said angle being welded to the lower edge of the depending flange 13.

The lower inclined primary distributor 22 is welded at its ends to the weir plates, its lower edge 25 being spaced slightly above the bottom wall 8. The horizontal or secondary distributor extends from the wall 13 of one cap portion to the wall 10 of an adjacent trough, and is secured thereto and to the weir plates by tack welding 26 or the like.

Short baffles 27 fixed to the bottom 8 of the troughs and to the inlet weirs 14 adjacent the ports 18, serve to direct flow of vapors through the distributors, thereby substantially preventing egress of vapors from said ports.

Means for supporting the trays within the absorber preferably include angle members 28 fixed to the tank walls and aligning with the weir plates mounted thereon. Extension flanges 29 of the trays are secured by continuous peripheral welds to the absorber for effecting complete partition walls within the tank. A downspout 30 is provided in each extension adjacent the outlet weir of a tray member, the tray members being inversely arranged in the absorber to cause back and forth travel of liquid while it moves downwardly in the container.

Assuming an absorber or similar device to be provided with bubble trays including troughs and caps as described, the process of absorbing one or more components, such as pentane, or natural butane, from vapors and gases would be as follows:

Oil entering the absorber through the inlet 2 flows downwardly from opposite ends of successive trays, filling the troughs to a level equal to the height of the weir plates, and normally submerging both primary and secondary distributing plates. A sufficient amount of oil is passed through the absorber to maintain the necessary liquid level in the troughs.

Gas or like vapors introduced into the absorber through the inlet 4 travel upwardly through the tortuous passages provided between the troughs and caps, and are restrained by the distributor plates. Gas or vapors flowing through the absorber in small quantities are effectively distributed by the primary plates, but if greater quantities of gas or vapors are employed, the secondary plates are necessary for their proper distribution in order to obtain maximum utility from the trays. In passing through the liquid filled troughs the gas or vapors are freed of the desired components and pass out of the absorber through the outlet 5, and the liquid, including the absorbed components, is drawn from the absorber through the line 3.

What we claim and desire to secure by Letters Patent is:

1. In combination with a tower, a tray in the tower including trough and cap members, the cap portion of one member overhanging the trough portion of an adjacent member, an inlet weir plate connecting one end of the members, and an outlet weir plate connecting the opposite end of the said members.

2. In combination with a tower, a tray in the tower including parallel trough and cap members, the cap portion of one member overhanging the trough portion of an adjacent member, an inlet weir plate connecting one end of the members, and an outlet weir plate connecting the opposite end of said members.

3. In combination with a tower, a tray in the tower including parallel trough and cap members, the cap portion of one member overhanging the trough portion of an adjacent member, an inlet weir plate connecting one end of the members, an outlet weir plate connecting the opposite end of the said members and distributor plates located between the trough and cap portions.

4. In apparatus of the character described, end weir plates, trough and cap members mounted in parallel relation and extending perpendicular to and between the weir plates, including trough and cap portions, the cap portion of one member arranged in overhanging, spaced relation with the trough portion of an adjacent member, a primary distributor plate in the trough portion, and a secondary distributor plate above the primary plate.

5. In apparatus of the character described, weir plates, trough and cap members mounted between the weir plates, including trough and cap portions arranged with the cap portion of one member above the trough portion of an adjacent member, an inclined primary distributor plate in the trough portion, and a perforated secondary distributor plate in the trough above said primary plate.

6. In apparatus of the character described, end weir plates having inlet and outlet ports respectively, trough and cap members mounted in parallel relation and extending perpendicular to and between the weir plates and including trough and cap portions, the cap portion of one member arranged above the trough portion of an adjacent member, an inclined primary distributor plate in the trough portion, a perforated secondary distributor plate above the primary plate, and baffles in the trough portions adjacent the inlet ports.

7. In apparatus of the character described, end weir plates having inlet and outlet ports, trough and cap members mounted in parallel relation and extending perpendicular to and between the weir plates and including trough and cap portions arranged with the cap portion of one member overhanging the trough portion of an adjacent member, articulated, inclined, primary distributor members in the trough portions, articulated, secondary, distributor members above said primary members, and baffles in the troughs adjacent said inlet ports.

8. In apparatus of the character described, a tray including parallel trough and cap members, the cap portion of one member overhanging the trough portion of an adjacent member, an inlet weir plate connecting one end of the members and having relatively large inlet openings, an outlet weir plate connecting the opposite end of the members and having relatively small outlet ports, and distributor plates located between the trough and cap portions.

9. In apparatus of the character described, a tray including parallel troughs and cap members, the cap portion of one member overhanging the trough portion of an adjacent member, an inlet weir plate connecting one end of the members and having relatively large inlet openings, an outlet weir plate connecting the opposite ends of the members and having relatively small outlet ports, an inclined distributor plate in the trough portions, and a perforated secondary distributor plate above the primary plate.

In testimony whereof we affix our signatures.

WILLIAM A. STOVER.
WALLACE G. PALMER.